Jan. 8, 1935.     A. KAHN     1,987,011
COMBINED SCOOP, DRAIN, AND COLLECTOR
Filed May 15, 1934
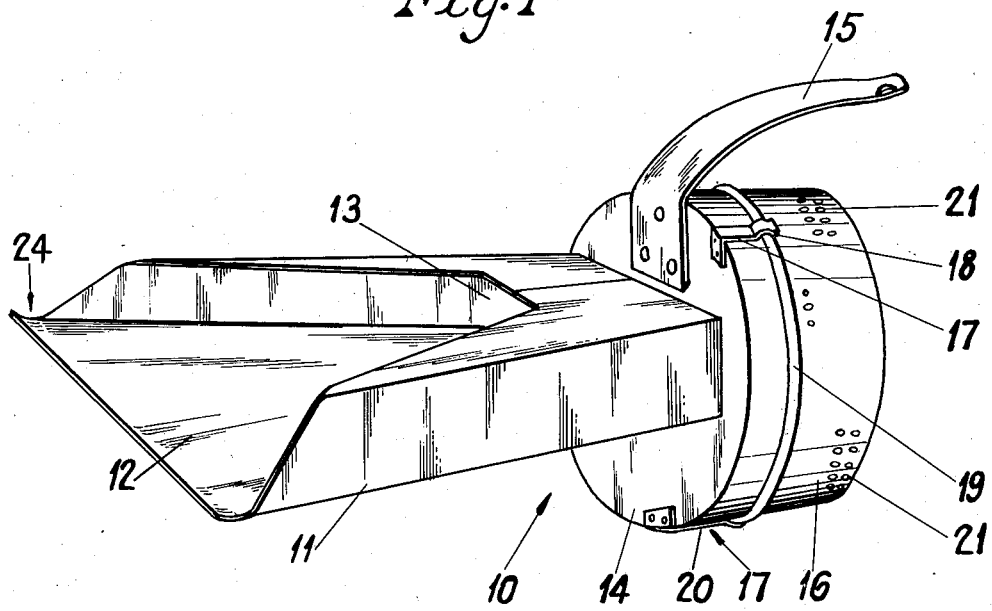
Fig. 1
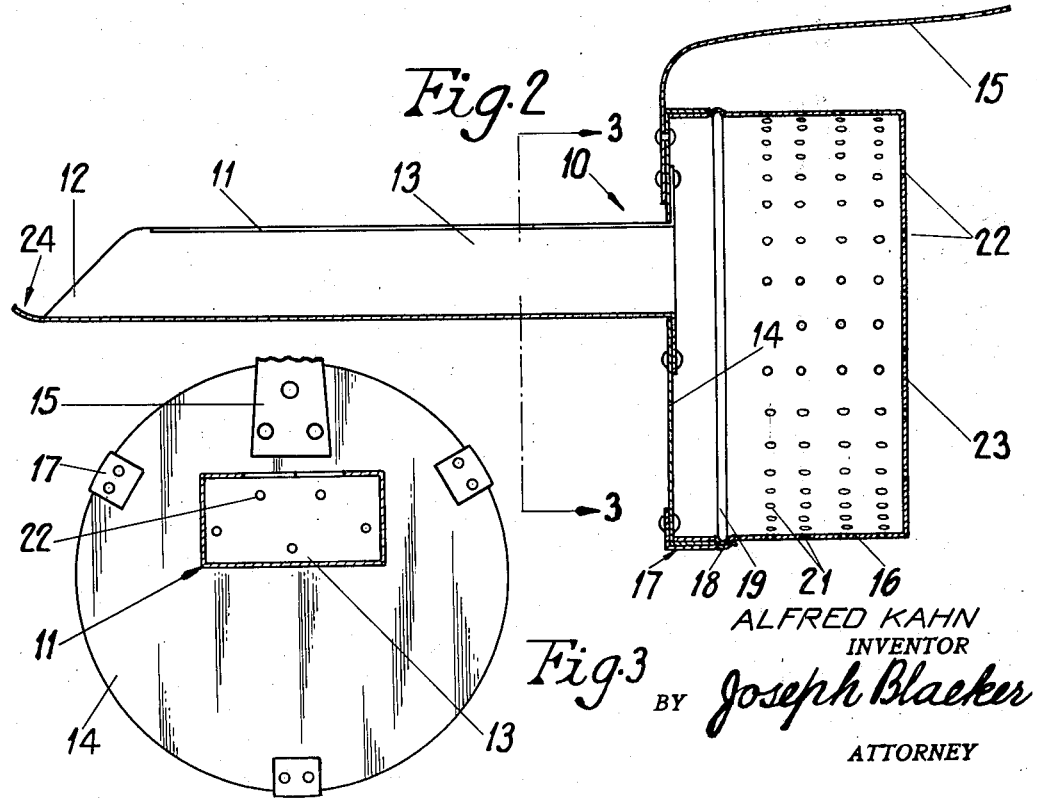
Fig. 2
Fig. 3
ALFRED KAHN
INVENTOR
BY Joseph Blacker
ATTORNEY Patented Jan. 8, 1935

1,987,011

UNITED STATES PATENT OFFICE 1,987,011

COMBINED SCOOP, DRAIN, AND COLLECTOR

Alfred Kahn, New York, N. Y.

Application May 15, 1934, Serial No. 725,761

3 Claims. (Cl. 210—149)

This invention relates to a combined scoop, drain and collector and particularly to an improved utensil for use in meat pickling tanks.

An object of this invention is to provide a combined utensil having a scoop for removing impurities such as small particles of fat and grease from brine tanks in which meat has been placed for pickling purposes to form "corned beef".

Another object of this invention is to provide the utensil with a removable collector or closure member having perforations through the base and through the sides so as to permit the brine to pass out therethrough while the scoop is moved in a skimming position over the surface of the liquid in the pickling tank.

Another object of this invention is to provide the scoop portion of the device with a retaining bead and to provide the removable collector with spring clips engageable with the said bead so as to securely hold the collector and scoop in unitary relation.

With the above and other objects in view, the invention will be hereinafter more particularly described, and the combination and arrangement of parts will be shown in the accompanying drawings and pointed out in the claims which form part of this specification.

Reference will now be had to the drawing, wherein like numerals of reference designate corresponding parts throughout the several views in which:

Figure 1 is a perspective view of my combined scoop, drain and collector.

Figure 2 is a central, vertical, sectional view.

Figure 3 is a cross-sectional view, the section being taken as on line 3—3 in Figure 2.

In the illustrated embodiment of the invention, the numeral 10 indicates a combined scoop, drain and collector, consisting of a deep shovel or scoop 11, having an open front end 12, a rectangular rear end 13, an integrally connected circularly dished member 14. A handle 15 has been fastened to the dished member 14 and faces in a direction lengthwise of the scoop 11 and centrally thereof. A container 16 of circular form and having an outside circumference of the same dimension as the inner circumference of the dished member 14 has been inserted in housing relation in the member 14. The container 16 may be secured to the dished member 14 by means of flat spring clips 17 fastened to the member 14 and having hook-shaped ends 18 in engagement with an annular outwardly facing retaining bead 19 on the periphery of the container.

The spring clips 17 may be made of spring metal or any other elastic resilient material with shanks 20 adapted to be riveted or otherwise secured to the outer surface of the dished member 14 and with their hook-shaped ends 18 forming clasp contacts which ride over the bead 19 when the container 16 is forced into or out from the member 14. Any plural number of spring clips 17 may be provided on the outside of the member 14, preferably three, positioned equi-distant with relation to each other.

A plurality of drain holes 21 of small diameter has been provided in the circular sides of the container 16 and a plurality of drain holes 22 of small diameter has been provided in the flat base 23 of the container.

As best shown at 24 in Figure 2, the front or receiving end 12 of the scoop 11 has been curved up to prevent the scooped up particles and liquid from flowing back into the pickling tank. As shown in Figure 1, the front end 12 has been made wider than the rear end for the purpose of scooping up the fat and grease particles over as large a surface area as possible with every forward movement of the scoop. In the preferred embodiment, the scoop is positioned above the center line of the collector and as close to the top as possible so as to prevent the collected matter from flowing back into the brine tank through the scoop.

The manner of using the device is as follows: The particles of fat and grease being lighter than the salt solution float on top of the liquid. The device is moved over the surface of the liquid so as to scoop up the fat and grease particles which, on raising the scoop end, will flow into the collector. The brine will flow through the drain holes back into the brine tank and leave the undesirable particles in the collector. On removing the collector from the scoop portion, the said particles may be dropped from the collector into a refuse can.

It is is to be noted that the gist of this invention is to provide a two-member structure adapted to retain the collected fatty matter therein, and that instead of forming the collector member with drain holes as shown, I may place the drain holes in the scoop member of the device.

The spring clip mechanism 17 and 19 may be taken as representing my suitable means for performing the same connecting function. The clips 17 are preferably flared outwardly at the hook-shaped ends 18 to facilitate the overriding movement of the clips over the bead 19.

It will thus be seen that there has been provided a practical device by means of which the floating impurities which tend to sour the contents of meat pickling tanks may be removed at short intervals.

I claim:

1. A combined scoop, drain and collector for meat pickling tanks, comprising in combination a scoop having a rectangular rear portion providing an aperture, a circularly dished member fastened to said scoop and having an aperture in alignment with said scoop aperture and having a handle at its periphery, a circularly formed collector having drain holes and being adapted to enter into said dished member, and spring means for securing said collector and said dished member into unitary relation, said collector being detachable from said dished member.

2. A combined scoop, drain and collector for meat pickling tanks, comprising in combination a scoop having a rear portion providing an opening, a plate member fastened to said scoop and having an aperture in alignment with said scoop opening and having a handle at its periphery, a collector having drain holes and being adapted to aline with said plate member, and means for securing said collector and said plate member and scoop into unitary relation, said collector being detachable from said plate member.

3. The invention as defined in claim 2 wherein the said scoop is positioned above the center of said collector and close to the top thereof to prevent the collected matter in said collector from flowing out through said scoop.

ALFRED KAHN.